United States Patent [19]
Downes, Jr. et al.

[11] Patent Number: 5,230,782
[45] Date of Patent: Jul. 27, 1993

[54] ELECTROLYTIC PROCESS FOR REDUCING THE ORGANIC CONTENT OF AN AQUEOUS COMPOSITION AND APPARATUS THEREFORE

[75] Inventors: Francis J. Downes, Jr.; Oscar A. Moreno, both of Vestal; Cindy M. Reidsema, Apalachin; Joseph E. Varsik, Binghamton, all of N.Y.

[73] Assignee: International Business Machines Corporation, Armonk, N.Y.

[21] Appl. No.: 733,662

[22] Filed: Jul. 22, 1991

[51] Int. Cl.$^5$ .............................................. C02F 1/46
[52] U.S. Cl. ........................... 204/149; 204/DIG. 13; 205/99; 205/100; 205/101
[58] Field of Search ............... 204/149, 275, DIG. 13, 204/294, 150; 205/99, 101, 100

[56] References Cited

U.S. PATENT DOCUMENTS

| | | | |
|---|---|---|---|
| 2,773,025 | 12/1956 | Ricks et al. | 204/149 |
| 3,764,499 | 10/1973 | Okubo et al. | 204/151 |
| 3,806,436 | 4/1974 | Tuwiner | 204/182.4 |
| 3,970,531 | 7/1976 | Recht | 204/149 |
| 4,046,655 | 9/1977 | Itai et al. | 204/149 |
| 4,144,149 | 3/1979 | Bollhalder et al. | 204/149 |
| 4,235,695 | 11/1980 | De Nora et al. | 204/268 |
| 4,324,629 | 4/1982 | Oka et al. | 204/182.4 |
| 4,417,963 | 11/1983 | Janne | 204/130 |
| 4,425,205 | 1/1984 | Honma et al. | 204/151 |
| 4,470,892 | 9/1984 | Das Gupta et al. | 204/105 R |
| 4,671,861 | 6/1987 | Krulik | 204/182.4 |

OTHER PUBLICATIONS

"Waste Treatment for Plating in the Soviet Union", Plating and Surface Finishing, pp. 62-64. Jul. 1981.
"Scanning Tunneling Microscopy and Raman Spectroscopy of Pyrolytic Graphite Electrodes", J. Electrochem Soc., vol. 137, No. 9, Sep. 1990, pp. 2791-2794.

*Primary Examiner*—John Niebling
*Assistant Examiner*—Arun S. Phasge
*Attorney, Agent, or Firm*—Pollock, Vande Sande & Priddy

[57] ABSTRACT

The total organic content (TOC) of an aqueous composition is reduced to 200 ppm or less by subjecting the composition to electrolysis whereby the pH of the composition at the start of the electrolysis is about 1.8 to about 7 to thereby electrolytically decompose organic materials contained in the aqueous composition.

19 Claims, 7 Drawing Sheets

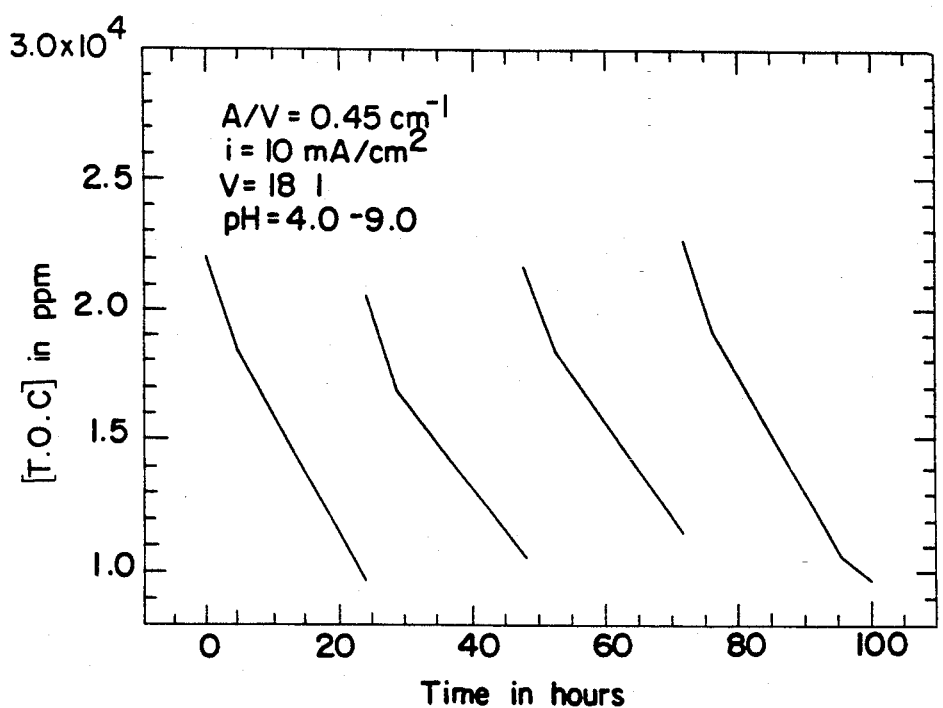
FIG. 5
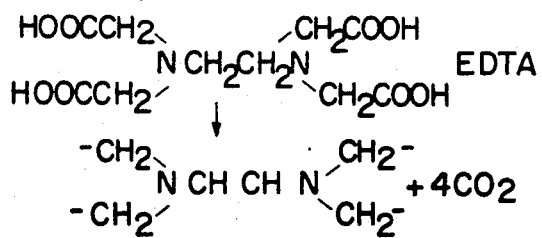
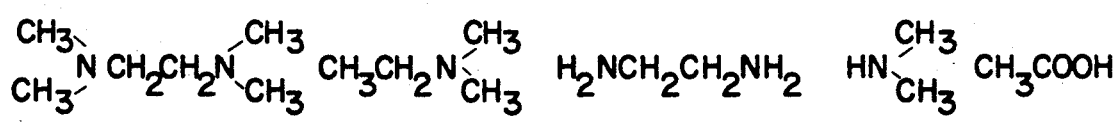
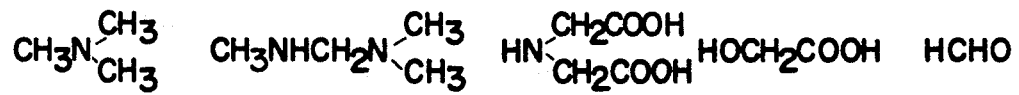
FIG. 6

ELECTROLYTIC PROCESS FOR REDUCING THE ORGANIC CONTENT OF AN AQUEOUS COMPOSITION AND APPARATUS THEREFORE

DESCRIPTION

1. Technical Field

The present invention is concerned with a process for reducing the TOC (Total Organic Content) of an aqueous composition to 200 ppm or less by subjecting the composition to electrolysis. The present invention is especially suitable for treating electroless metal plating compositions. The process of the present invention finds particular applicability when used in conjunction with procedures to reduce the metal ion content in the electroless metal plating composition followed by precipitating out solid organic complexing agent. The present invention is also concerned with apparatus that is capable of carrying out the process of the present invention.

2. Background Art

Electroless metal plating baths, such as copper baths, are used in the electronics industry as a means to uniformly plate circuit boards and cards including those that contain complex patterns and circuitry. The wide use of electroless plating baths such as copper, nickel and gold electroless plating baths is a concern since such lead to chemical waste streams that require treatment. For instance, such baths, due to the nature of its steady state operation, generate an overflow. This overflow contains the same concentration of chemicals as the baths which includes both the feed chemicals and certain reaction by-products. For example, electroless copper plating baths generally contain cupric ions, a reducing agent, and a complexing agent for the cupric ions. Moreover, the bath may contain numerous other chemicals such as, for instance, cyanide ions as disclosed in U.S. Pat. No. 3,844,799 Underkofler et al. and a surfactant. With respect to electroless copper plating processes attention is also directed to U.S. Pat. No. 4,152,467 to Alpaugh et al.

The overflow from the plating bath is not usable in its initial form, although reclamation of certain feed chemicals is possible. Accordingly, the composition that remains following reclamation must be treated in order to meet government standards that control the disposal of chemicals into the environment. For instance, overflow chemical waste streams from such processes are currently processed to remove copper and recover and recycle the complexing agent such as the ethylene diamine tetraacetic acid in a sequence of steps commonly referred to as "primary recovery." One such "primary recovery" technique is disclosed in U.S. Pat. No. 4,734,175 to Bissinger and assigned to the assignee of the present application, International Business Machines Corporation, disclosure of which is incorporated herein by reference. Such process involves removing copper from a plating bath overflow composition by an electrolysis procedure to plate out copper, (i.e., deplating) from the solution onto copper cathodes. Sufficient copper is removed so that its content is below 20 milligrams/liter. In addition to the presence of any remaining copper, the effluent resulting from such a treatment contains complexing agent for the copper and relatively large amounts of dissolved organic and inorganic salts.

After the copper is removed, the composition is then transferred to another vessel where the complexing agent is precipitated by the addition of an acid such as sulphuric acid or hydrochloric acid to provide a pH suitable for causing the complexing agent to precipitate out of the composition.

After the complexing agent settles to the bottom of the treatment vessel, the liquid composition which is decanted is termed "additive waste."

The complexing agent remaining at the bottom of the vessel is generally washed at least twice with deionized water and is then recycled back to the plating bath. These two wash solutions or decants contain mainly sodium sulphate and formic acid along with dissolved and suspended complexing agent. These wash solutions can be combined with the additive waste solution or held for separate treatment or usage. However, in all cases, significant amounts of suspended complexing agent are transferred into the waste solutions and the particulate complexing agent must be removed by filtration prior to further treatment. As result, the materials are currently unacceptable for direct discharge to existing plant waste treatment systems. Accordingly, the material is pumped to a storage tank and later trucked away to a controlled land fill or other disposal methods at a substantial cost per year.

Moreover, even if the additive waste solution contained only sodium sulphate and a few hundred ppm of the complexing agent, it would not be put through the plant waste treatment because the complexing agent would tend to dissolve heavy metals by complexing from the various piping systems used and thereby carry these into surrounding natural water sources, such as rivers, where the composition is finally discharged. Although copper would make up the bulk of the complex metal, small amounts of other heavy metals are quite possible.

SUMMARY OF THE INVENTION

The present invention is concerned with a process for reducing the total organic content (TOC) of an aqueous composition to ppm or less. The process of the present invention includes subjecting an aqueous composition that contains an organic reducing agent or reduced form of the reducing agent or both to electrolysis. The pH of the aqueous composition at the start of the electrolysis is about 1.8 to about 7. Organic materials in the aqueous composition are electrolytically decomposed to thereby obtain a composition having a TOC content of 200 ppm or less.

Another aspect of the present invention is directed to a process for treating an electroless metal plating composition wherein the plating composition contains metal ions, solid organic complexing agent and organic reducing agent and/or reduced form thereof. The process includes reducing the metal ion content in the electroless metal plating composition to a value below about 20 milligrams/liter by electrolysis. The composition is then acidified to a pH of about 1.8 or less to thereby precipitate solid organic complexing agent from the composition. Next, the composition is subjected to electrolysis to thereby electrolytically decompose organic materials therein including reducing agent or reduced form of the reducing agent or both to obtain a composition having a TOC content of 200 ppm or less.

A still further aspect of the present invention is concerned with apparatus for treating an electroless metal plating composition that contains metal ions, solid organic complexing agent and organic reducing agent or reduced form thereof or both. The apparatus includes an electrolytic unit that contains at least one pair of an anode and a cathode for removing metal from the electroless metal plating composition by electrolysis. Means to convey the composition to the electrolytic unit is provided. Also, means for removing composition from the electrolytic unit after the removal of the metal by electrolysis is provided along with means for conveying the composition so removed from the electrolytic unit to a vessel for achieving precipitation of solid organic complexing agent from the composition. Means are provided for conveying the composition treated in the vessel to convey the composition from the vessel and to convey the composition to an electrolytic cell. The electrolytic cell contains at least one pair of an anode and cathode for electrolytically decomposing organic materials in the composition.

SUMMARY OF DRAWINGS

FIG. 5 illustrates durability tests carried out on an anode material employed pursuant to the present invention.

FIG. 6 illustrates decomposition reactions of ethylene diamine tetraacetic acid.

BEST AND VARIOUS MODES FOR CARRYING OUT THE INVENTION

Figure 1:
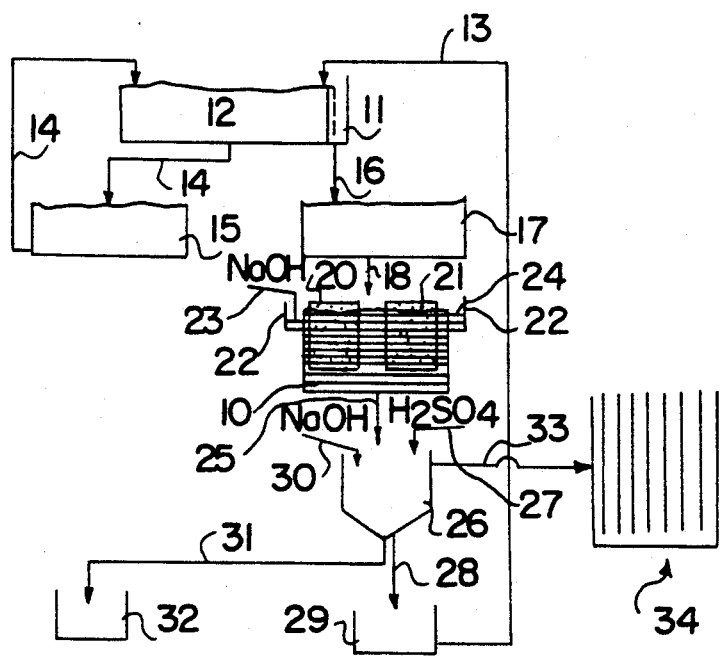
FIG. 1 illustrates a flow chart of the process pursuant to the present invention.

In order to facilitate understanding of the present invention, reference is made to the flow diagram illustrated in FIG. 1. In particular, an electroless plating vessel 12 contains parts to be plated (not shown) and an electroless metal plating composition such as a nickel, gold, or preferably copper plating composition. Electroless copper plating baths typically contain copper ions in divalent form; complexing agents such as ethylene diamine tetraacetic acid (EDTA) for maintaining the copper in its divalent forms; alkali for buffering off excessive hydrogen ions and maintaining the desired pH value and reducing agents such as formaldehyde. Such baths also typically contain stabilizers, such as cyanide and wetting agents. Typical electroless plating baths along with working parameters for temperature and pH are illustrated below in Table I.

TABLE I

| Material | Concentration (range) |
| --- | --- |
| CuSO4.5H2O | 6.0–10.0 g/l |
| EDTA | 35.0–55.0 g/l |
| GAFAC RE-610 | 0.01–0.5 g/l |
| NaCN | 5.0–20.0 mg/l |
| Formaldehyde | 2.0–4.5 mL/l |
| Na2SO4 | 15.0–25.0 g/l |
| NaHCOO | 15.0–25.0 g/l |
| pH | 11.6–11.8 |

TABLE I-continued

| Material | Concentration (range) |
| --- | --- |
| Temperature | 73.0° C. ± 0.5 |

In normal operation, the electroless bath is continuously monitored for the above chemicals in order to assure uniform deposition of the metal. Due to the nature of the plating being a steady state operation, an overflow as illustrated by the broken line portion of line 16 is generated. Also, the reducing agent will be reduced during the plating process. For instance when formaldehyde is the reducing agent, such will be reduced to produce formate salts. Moreover, relatively large quantities of sulphate also normally build up in the above defined copper electroless plating bath.

The overflow from the electroless plating bath is removed via conduit 16 to a storage or collector tank 17 having a typical size of about 1,000 to about 10,000 gallons and more typically about 3,000 gallon capacity. From the storage tank 17, the composition is conveyed via conduit 18 to electrolytic unit 10. The electrolytic unit 10 includes two electrode blocks 20 and 21 consisting of a series of anodes and cathodes and typically about 60 to about 250 anodes and cathodes. In addition, electrolytic unit 10 is provided with overflow tanks 22, in one of which pH measuring probe 24 is installed and to the other one of which, position on the opposite side, an alkali such as sodium hydroxide solution is added through conduit 23 for setting and maintaining the desired pH value. The particular number and dimensions of the electrodes in each electrode block are determined on the basis of the current strength I, the current density i and the size of the tank. The electrodes are reciprocally arranged in such a manner that there is always one cathode between two anodes. The cathodes preferably are thin copper foils and the anodes are preferably of stainless steel. The pH of the composition in the electrolytic unit is maintained during the electrolysis at a value of at least about 12.5 and preferably 12.5 to about 13.1 in order to prevent oxidation of the complexing agent such as the EDTA in electrolytic unit 10. The pH can be adjusted by incorporating an alkali via conduit 23 such as a 50% sodium hydroxide solution.

In the electrolytic unit 10, the metal such as copper from the composition is plated onto the cathodes and cyanide, when present, is oxidized to carbon dioxide at the anodes.

This electrolysis is typically carried out at a constant voltage of about 3.4 to about 4 volts employing a current of about 1,500 to about 3,000 amperes, more typically about 2,100 amperes. The current density employed is typically about $2^{mA}/cm^2$ to about $10^{mA}/cm^2$, and more typically $4.2^{mA}/cm^2$ to about $5.5^{mA}/cm^2$. This electrolysis typically takes from about 16 to about 24 hours for a typical 400 to about 2,400 gallons, more typically about a 2,000 gallon bath. The electrolysis is carried out to reduce the metal value in the composition to below about 20 mg/l and preferably to a value of about 10 ppm or less. In addition, the cyanide content is reduced to a value of about 1.0 ppm or less and preferably of about 0.8 ppm or less.

Since gases including hydrogen and oxygen are produced during the electrolysis, such should be removed from the electrodes where formed as quickly as possible in order to improve the cathodic current yield relative to the metal to the deposited and to reduce the electrolysis time for achieving the desired end result. The gas can be removed from the electrodes described in U.S. Pat. No. 4734175 by using for the electrolysis, a high internal bath circulation rate in which the electroless plating composition is circulated at about 1.0 to about 5.0 volumes per hour. In a electroless cell of about 2,000 gallon capacity, about 100% of the electroless plating bath is to be circulated per hour at a movement of 2.0 volumes per hour. FIG. 5 of U.S. Pat. No. 4,734,175 illustrates an apparatus in which the composition is circulated by means of injection tubes positioned below the electrodes. The composition is fed from the electroless cell to overflow tanks arranged on either side of the electrolytic unit 10, from which it is fed back through the injection tubes.

After removal of the metal, the composition is conveyed via conduit 25 by pumping means (not shown) to precipitation/decanting vessel 26 the typical size being a 4,200 gallon capacity tank. The pH of the composition is adjusted to a value of 1.5 to 1.8 or less and preferably about 1.8 by the addition of an acid such as sulphuric acid or hydrochloric acid via conduit 27. The pH is adjusted in order to cause the complexing agent such as the ethylene diamine tetraacetic acid to precipitate out of the composition. Other solid organic complexing agent include potassium sodium tartrate (Rochelle salt), ethylene diamine tetraamine, the sodium (mono-, di-, tri-, and tetra-sodium) salts of ethylene diamine tretraacetic acid, nitrilo tetraacetic acid and its alkali salts, gluconic acid, gluconates, glucono (gamma), lactone, modified ethylene diamine acetates, such as N-hydroxy ethyl ethylene diamine triacetate. Moreover, a number of other suitable complexing agents for cupric ions are suggested in U.S. Pat. Nos. 2,996,408, 3,075,856, 3,076,855 and 2,938,805. The preferred complexing agents are ethylene diamine tetraacetic acid and the alkali metal salts thereof.

After the precipitate has settled, the mother liquor is removed via conduit 33 and conveyed to the electrolytic cell 34.

The precipitated complexing agent can be washed for example two or three times in deionized water, the water used for washing being fed to vessel 32 via conduit 31. Subsequently, the complexing agent may be dissolved once more as the tetrasodium salt in sodium hydroxide solution and be cleaned by being reprecipitated with an acid such as sulphuric acid. In vessel 26, if desired, the cleaned ethylene diamine tetraacetic acid is dissolved in an alkali solution such as a sodium hydroxide solution, added via conduit 30, to provide tetrasodium salt. Via conduit 28, the EDTA-Na4 (tetrasodium edetate), composition is conveyed to storage vessel 29 from where it can be transferred directly to chemical plating bath 12 via conduit 13, or a preliminary mixture with copper sulphate solution can be prepared which is then also fed to chemical plating bath 12 in vessel 11.

The used water solutions for washing the EDTA if desired can be mixed with the mother liquor and conveyed to the electrolytic cell 34. At this stage the composition typically has a complexing agent concentration of 300 to about 500 ppm more typically 400 ppm and a reducing agent in its reduced form (e.g., sodium formate) concentration of 15 to about 25 grams per liter and more typically about 18 to about 24 grams per liter. Upon addition of the rinse water, the concentration of the sodium formate is 5 to about 15 grams per liter and more typically about 7 grams per liter.

The flow rate of the composition in the electrolytic cell is typically about 0.1 to about 10.0 gallons per minute and more typically about 0.5 to about 5 gallons per minute and can be measured by a rotameter such as that made by ColeParmer (catalog no. N-03248-44). The pH is typically about 1.8 to about 7.0 and preferably about 1.8 to about 4 at the start of the electrolysis. The pH can be measured with a glass electrode such as one made by Fisher Scientific and connected to an Orion pH meter model 501. The temperature of the composition during the electrolytic decomposition is typically about 15° C. to about 35° C. and more typically about 22° C. to about 28° C. The current density should be about $1^{mA}/cm^2$ to about $15^{mA}/cm^2$ and preferably about $5^{mA}/cm^2$ to about $10^{mA}/cm^2$ and the voltage should be about 1 volt to about 6 volts and preferably about 2 volts to about 3 volts. The composition is maintained in the electrolytic cell for about 4 to about 36 hours and more typically about 8 to about 24 hours. The composition removed from the electrolytic cell has a TOC of about 200 ppm or less and preferably about 20 ppm or less.

The reduced form of the reducing agent such as the formate ion produced from the reduction of formaldehyde decomposes according to the following reaction:

$$2HCOO^- \rightarrow 2CO_2 + H_2 + 2e^-$$

Moreover, surfactant that may be present in the composition is also reduced at the cathode to provide phosphates and carbon dioxide. Water is also destroyed in the electroless process according to the following reaction:

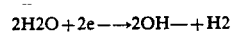

$$2H_2O + 2e^- \rightarrow 2OH^- + H_2$$

The composition is now acceptable to be combined with the plant general rinse compositions.

Figure 2:
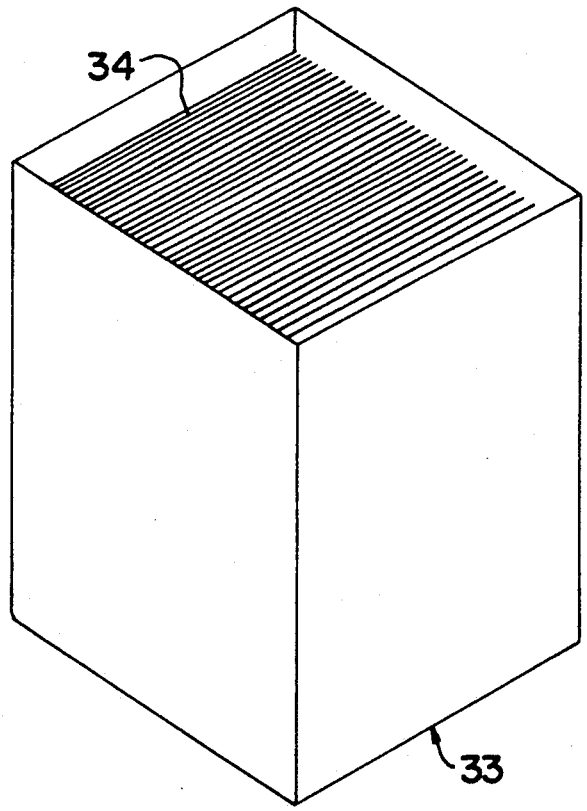
FIG. 2 is an isometric view of an electrolytic cell that can be used for decomposing organic materials pursuant to the present invention.

A typical electrolytic unit 33 includes a rectangular tank made of high density polyethylene having the following dimensions: 360 mm long, 260 mm wide, and 260 mm deep. The electrolytic vessel of these dimensions has a capacity of about 24 liters when empty and holds about 18 liters when the electrodes, electrode holders and ancillary hoses are installed. The electrodes 34 in a unit of the above dimensions are typically about 215 mm high, about 178 mm wide and about 1.5 mm thick. Typically a plurality of sets of anodes and cathodes are installed in an alternate pitch (anode-cathode) with an anode-cathode separation of about 5 to about 15 mm, more typically about 10 mm. Approximately 24 electrodes are employed in the unit of the above dimensions. The electrolysis cell is preferably in the form of a battery cell having alternating anodes and cathodes as shown in FIG. 2. In fact, a flow through cell is not especially effective in carrying out the present invention, particularly in view of the "poisoning" of the electrodes that can occur by the intermediate radical in the decomposition of formate, for instance. The electrode holder (not shown) is composed of two sheets of a polymeric material such as polyvinyl chloride in which grooves are machined to hold the electrodes in place.

The anodes and cathodes are connected to a power supply (not shown) by a bus (not shown) that included a copper metal bar, cylindrical in shape, about 6 mm in diameter and 300 mm in length. Two buses are present at all times for both the anode and cathode sets. The voltage applied across the electrode gap can be measured by employing a voltmeter connected to the terminal ends of each bus.

Constant electrical current is supplied to the electrolytic cell such as employing about 100 amperes at about 15 volts. Suitable anode materials include various metal alloys and preferably carbon anodes including pyrolitic graphite. Commercially available pyrolitic graphite materials include Calgraph from Polycarbon, Inc., Pyroid from Pfizer, PP101 from Stackpole Ultra Carbon Inc. and RVC-60 from Pfizer. Since the anode materials are more susceptible to corrosion due to the aggressiveness of the composition being decomposed and to the electrical voltage polarity applied, such are preferably encased in a mesh of polypropylene in order to increase their lifetime. The mesh has the purpose of holding together the layers of pyrolitic graphite, when employed, and thus avoiding excessive erosion of the anodes.

Figure 3:
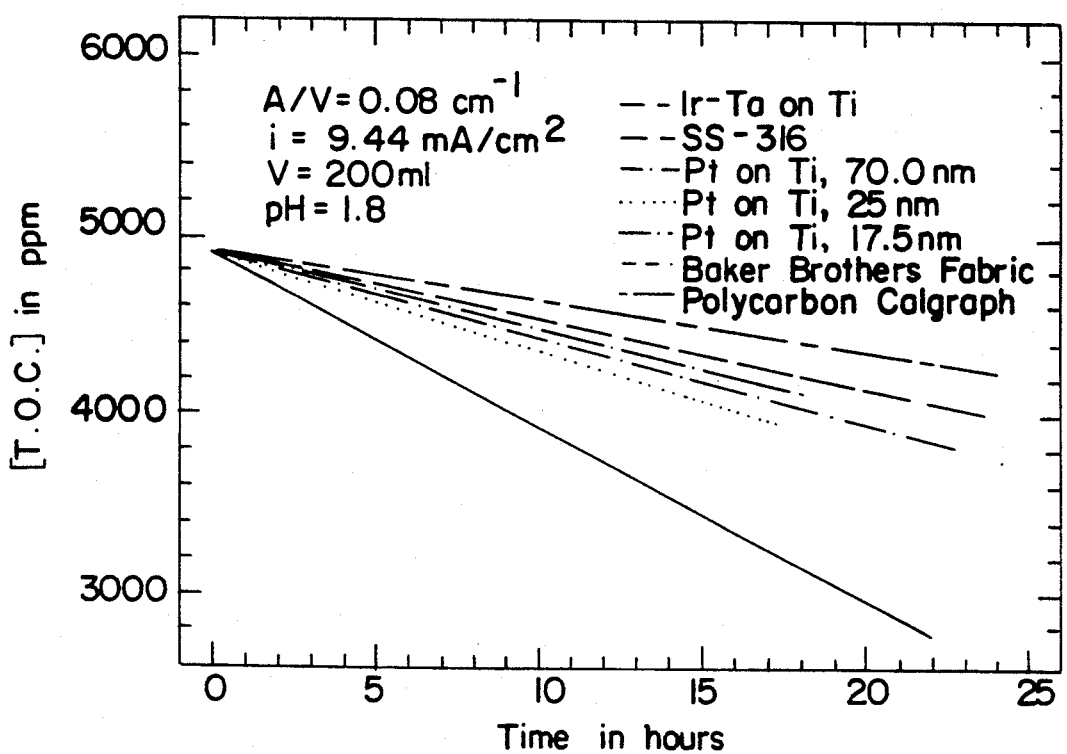
FIGS. 3 and 4 illustrate the effect of various anode materials in the electrolytic composition process.
Figure 4:
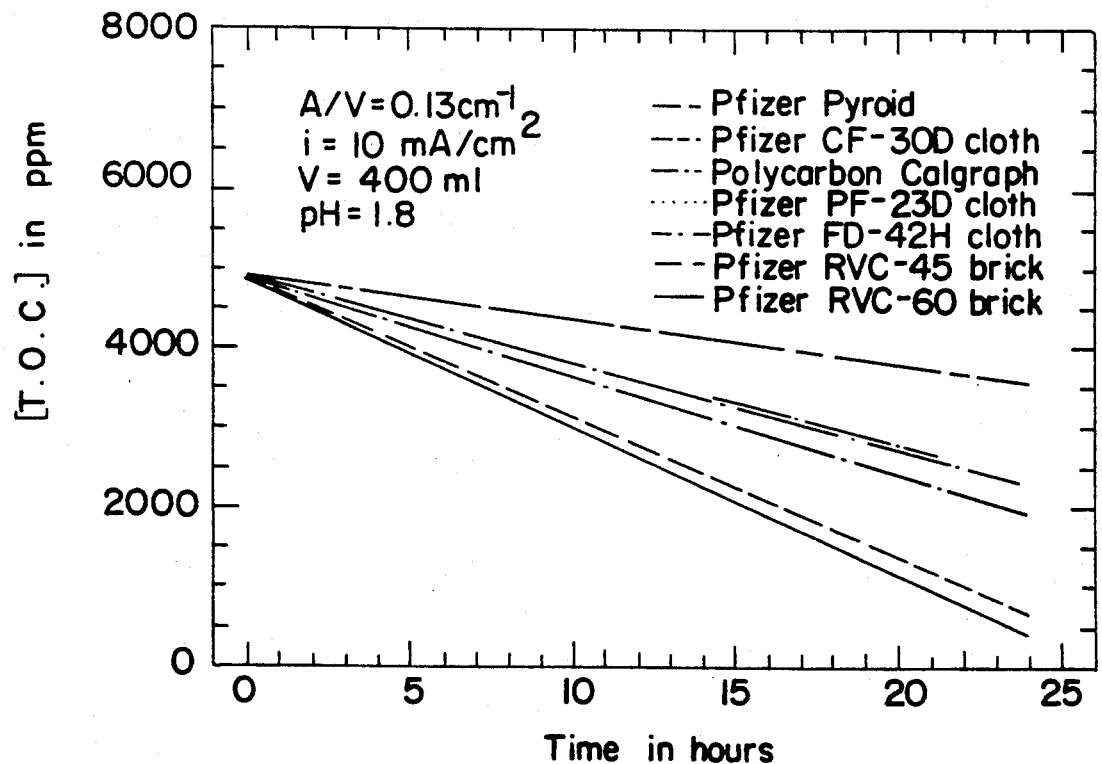
Figure 7:
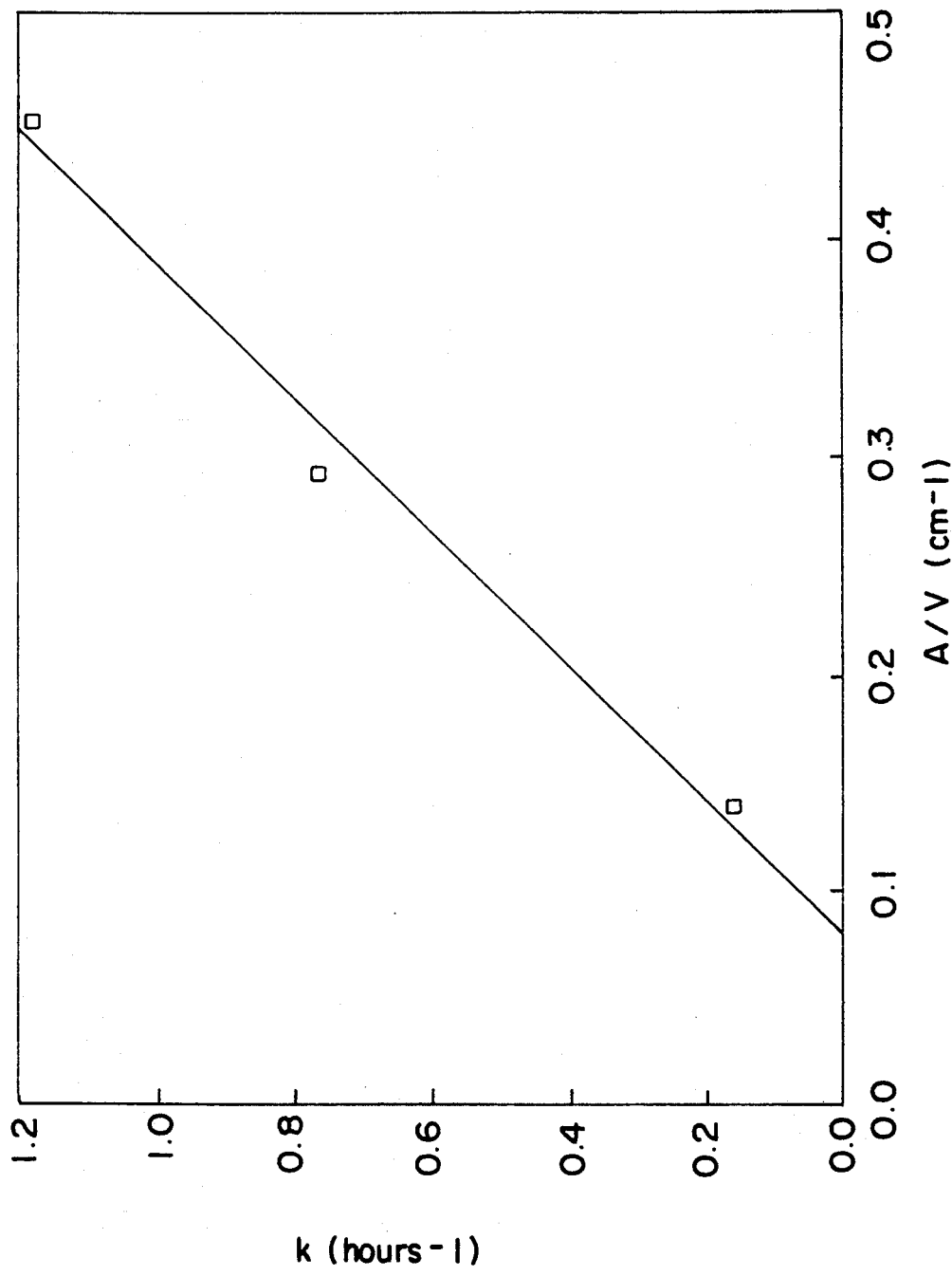
FIG. 7 illustrates the rate of destruction of ethylene diamine tetraacetic acid as a function of the area to volume ratio of the anode employed.
Figure 8:
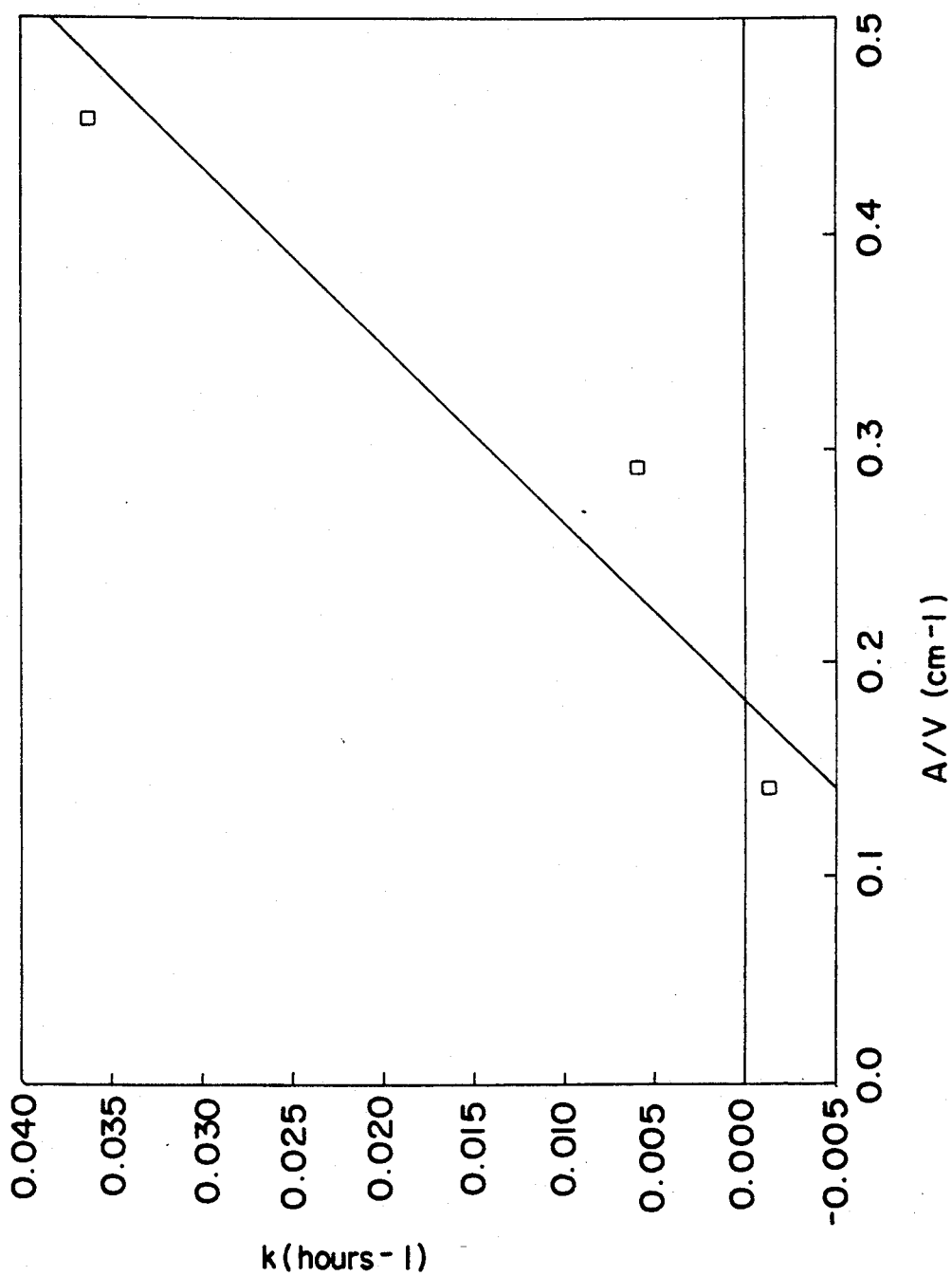
FIG. 8 illustrates the rate of destruction of formate as function of the area to volume ratio of the anode.

FIGS. 3 and 4 show the effect of various anode materials on TOC plotted against time in the process of the present invention. FIG. 5 is a test illustrating the ability of the anodes to retain their catalytic activity throughout a hundred hour test. The test consisted of installing a set of three anode-cathode pairs in a 1.75 liter rectangular glass tank and employing a value of composition to be treated of about 1.0 liters.

Suitable cathode materials include various metals and metal alloys as well as carbon such as pyrolitic graphite. The preferred cathode materials are stainless steel and titanium with titanium being the most preferred. The main purpose for the cathode material is to collect any metal ions that still remain in the composition at this stage and to discharge hydrogen gas from the solution. Since some metal such as copper accumulates on the cathode surface, the metal should be easily separated from the cathode material.

The following non-limiting Examples are presented to facilitate understanding of the present invention.

EXAMPLE 1

Figure 9:
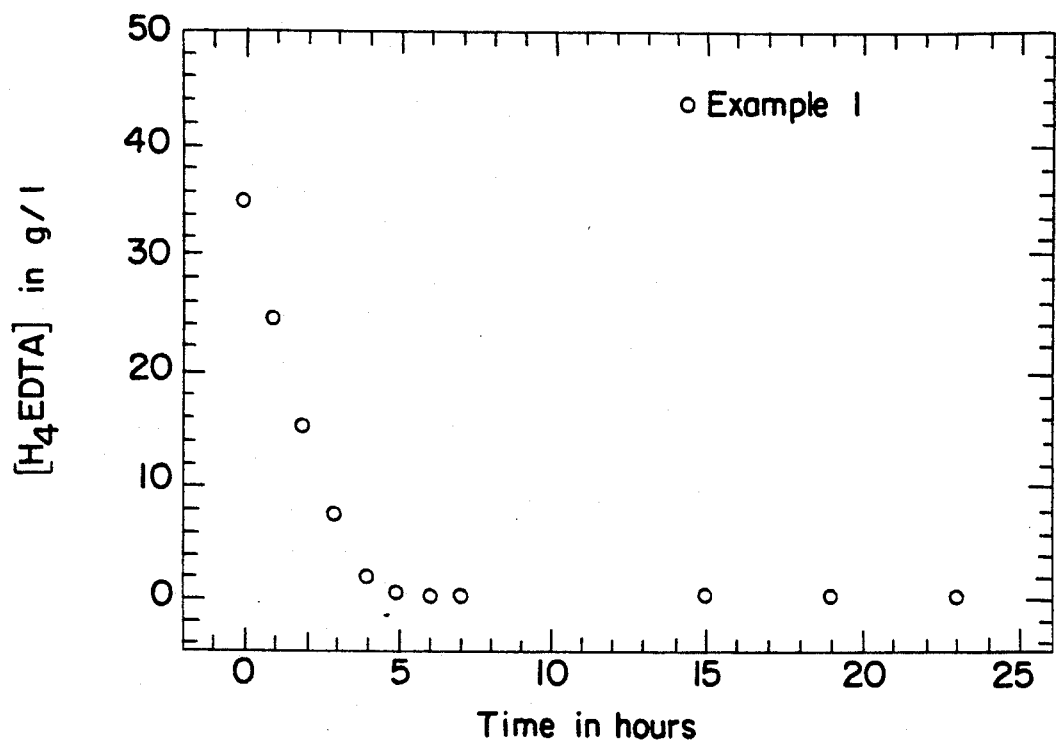
FIGS. 9 and 11 illustrate the concentration reduction of H4 EDTA as a function of time.
Figure 10:
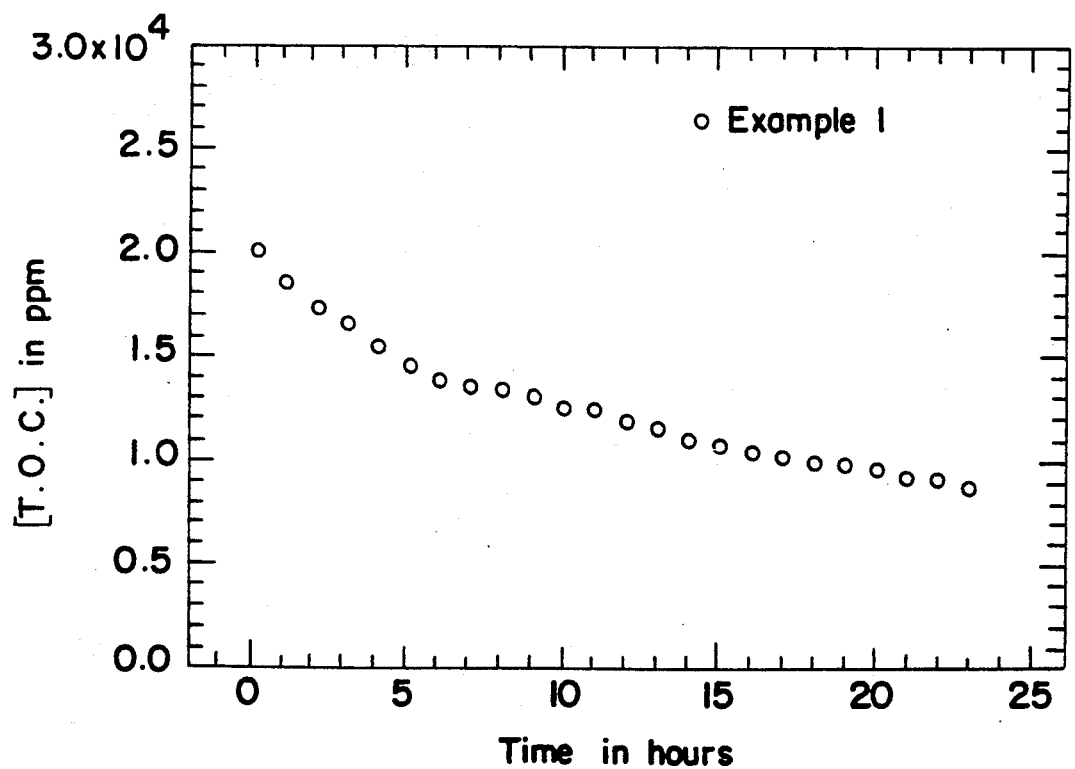
FIGS. 10 and 12 illustrate the level of TOC as a function of time.

A composition containing about 40 grams per liter of H4EDTA, about 24.5 grams per liter of NaCOOH, about 20 grams per liter of Na2SO4; about 0.2 grams per liter of GAFAC RE-610 and a pH of about 4 is introduced into an 18 liter cell having a total anode area of about 1.7 square meters and an area to volume ratio of about 30 m-1 at a flow rate of about $0.126 \times 10^{-3}$ M3/seconds. The current density is about $10^{mA}/cm^2$. The process is continued for about 24 hours. FIGS. 9 and 10 illustrate the concentration reduction of the H4EDTA and the TOC respectively as a function of time. The chelating agent is oxidized to its fundamental components of CO2, NH3 and H2O. The other organic materials in the composition are oxidized to CO2, NH3, and H2O.

EXAMPLE 2

Figure 11:
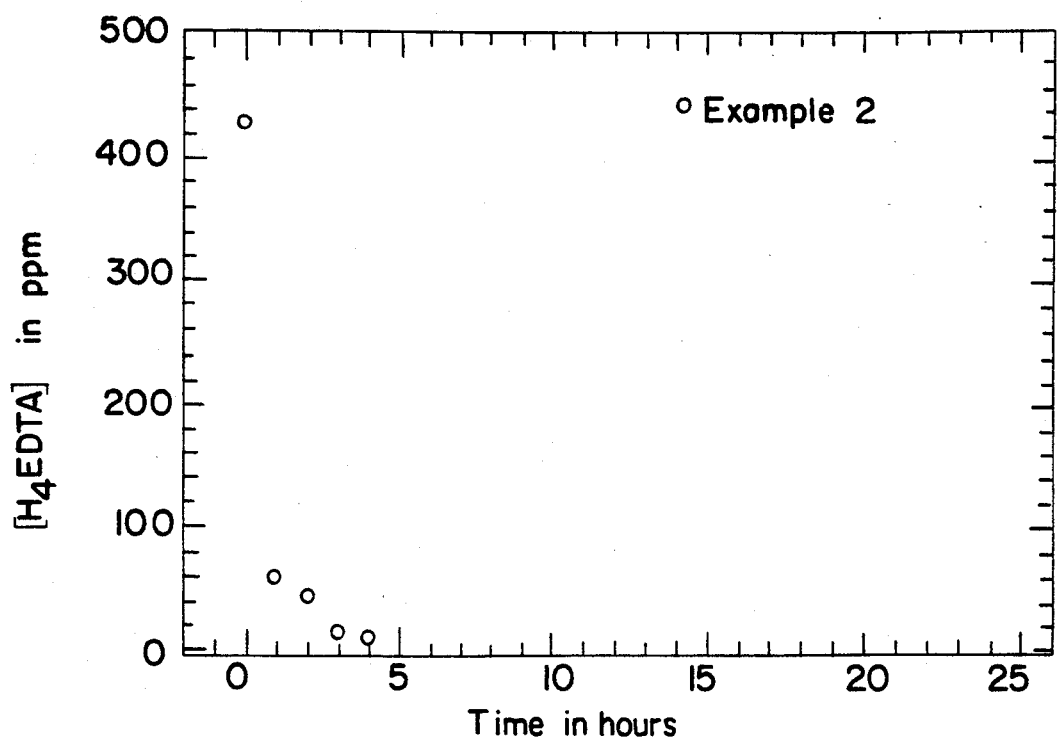
Figure 12:
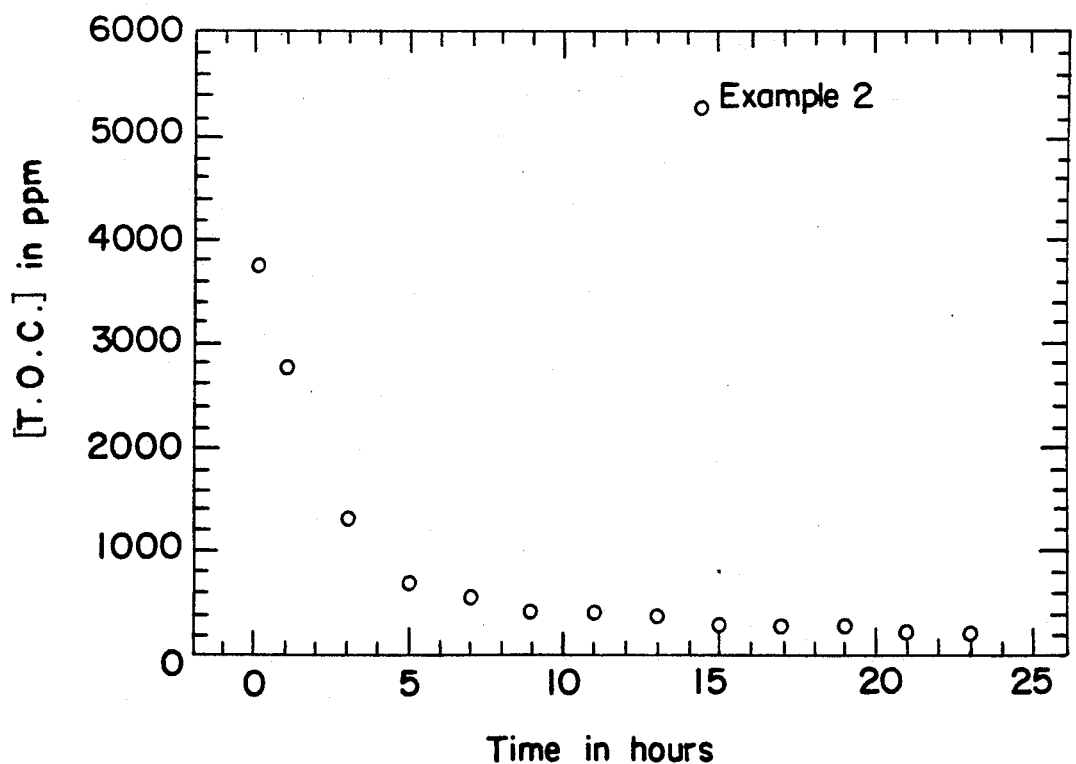

Example 1 is repeated except that the initial composition contains about 1.4 grams per liter of H4EDTA, about 24.5 grams per liter of NaCOOH, about 20 grams per liter of NA2SO4, about 0.2 grams per liter of GAFAC RE-610 and has a pH initially of about 4. The results from a 24 hour run are illustrated in FIGS. 11 and 12. FIG. 11 shows the concentration reduction of the H4EDTA as a function of time and FIG. 12 shows the levels of TOC as function of time.

The above examples clearly illustrate the effectiveness of the present invention in decomposing the organic materials in the composition to CO2, NH4, H2O and H2 to result in a composition ready for general rinse and meeting government regulations for disposal to the environment.

What is claimed is:

1. A process for reducing the TOC content of an aqueous composition to 200 ppm or less by subjecting said aqueous composition containing about 15 grams/liter to about 25 grams/liter of formate to electrolysis wherein the pH of the composition at the start of said electrolysis is about 1.8 to about 7 to thereby electrolytically decompose organic materials including said formate to obtain a treated composition having a TOC content of 200 ppm or less.

2. The process of claim 1 wherein said aqueous composition contains at least about $18^{gm}/l$ to about $24^{gm}/l$ grams per liter of formate.

3. The process of claim 1 wherein the electrolysis is carried out at a current density of about $5^{mA}cm^2$ to about $10^{mA}/cm^2$.

4. The process of claim 1 wherein the electrolysis is carried out at a voltage of about 2 volts to about 3 volts.

5. The process of claim 1 wherein the electrolysis is carried out for about 8 to about 24 hours.

6. The process of claim 1 wherein the treated composition obtained has a TOC content of 20 ppm or less.

7. The process of claim 1 wherein the aqueous composition further contains about 300 to about 20,000 ppm of complexing agent.

8. The process of claim 7 wherein said complexing agent is ethylene diamine or alkali metal salt thereof.

9. The process of claim 1 wherein the pH of the aqueous composition at the start of the electrolysis is about 1.8 to about 4.

10. A process for treating an electroless metal plating composition containing metal ions, solid organic complexing agent and about 15 grams/liter to about 25 grams/liter of formate which comprises reducing the metal ion content in said electroless metal plating composition to a value below about 20 mg/l by electrolysis; then acidifying said composition to a pH of about 1.8 or less, to thereby precipitate said solid organic complexing agent in said plating composition; and then subjecting said plating composition to electrolysis to thereby electrolytically decompose organic materials including said formate, in said composition to obtain a treated composition having a TOC content of 200 ppm or less.

11. The process of claim 10 wherein said electroless metal plating composition is a copper plating composition.

12. The process of claim 11 wherein said complexing agent is ethylene diamine tetraacetic acid or alkali metal salt thereof.

13. The process of claim 11 wherein said plating composition further contains cyanide ions and a wetting agent.

14. The process of claim 11 wherein the electrolysis to reduce the metal content is carried out at a voltage of about 3.4 to about 4 volts.

15. The process of claim 11 wherein the TOC content is reduced to 20 ppm by said electrolysis.

16. The process of claim 11 wherein said plating composition is acidified by adding sulphuric acid or hydrochloric acid.

17. The process of claim 11 wherein said plating composition has a pH at the start of the electrolysis of about 1.8 to about 7 for the decomposition.

18. The process of claim 10 wherein the electrolysis for the decomposition is carried out at a current density of about $5^{mA}/cm^2$ to about $10^{mA}/cm^2$ and a voltage of about 2 volts to about 3 volts.

19. The process of claim 10 wherein the plating composition has a pH of about 1.8 to about 4 at the start of the electrolysis for the decomposition.

* * * * *